(12) United States Patent
Kyusojin (10) Patent No.: US 8,099,531 B2
(45) Date of Patent: Jan. 17, 2012

(54) INFORMATION PROCESSING METHOD AND COMPUTER PROGRAM COMPRISING NETWORK CARD WHEREIN A PLURALITY OF PROCESSORS SWITCHES USE OF NETWORK CARD RELATED TO SETTING OF RESOURCE FLAG

(75) Inventor: Hiroshi Kyusojin, Tokyo (JP)

(73) Assignee: Sony Corporation, Tokyo (JP)

( * ) Notice: Subject to any disclaimer, the term of this patent is extended or adjusted under 35 U.S.C. 154(b) by 301 days.

(21) Appl. No.: 12/423,126

(22) Filed: Apr. 14, 2009

(65) Prior Publication Data

US 2009/0265721 A1  Oct. 22, 2009

(30) Foreign Application Priority Data

Apr. 16, 2008  (JP) ................ P2008-106355

(51) Int. Cl.
*G06F 3/00* (2006.01)
*G06F 9/44* (2006.01)

(52) U.S. Cl. .......... 710/36; 710/154; 710/308; 710/260; 710/321; 709/318; 709/319; 709/320; 709/321; 719/321

(58) Field of Classification Search .............. 710/36, 710/154, 308, 321, 260; 709/318–321
See application file for complete search history.

(56) References Cited

U.S. PATENT DOCUMENTS

| 6,085,215 A * | 7/2000 | Ramakrishnan et al. ..... 718/102 |
| 6,631,422 B1 * | 10/2003 | Althaus et al. ................ 709/250 |
| 7,500,067 B2 * | 3/2009 | Rangarajan et al. .......... 711/147 |
| 2005/0257222 A1 * | 11/2005 | Davis et al. ................... 718/104 |
| 2009/0183157 A1 * | 7/2009 | Tran et al. ..................... 718/100 |

FOREIGN PATENT DOCUMENTS

| JP | 02-216576 | 8/1990 |
| JP | 06-223047 | 8/1994 |
| JP | 08-249254 | 9/1996 |
| JP | 08-278953 | 10/1996 |
| JP | 09-160883 | 6/1997 |
| JP | 2002-091895 | 3/2002 |
| JP | 2003-296262 | 10/2003 |
| JP | 2004-206369 | 7/2004 |
| JP | 2005-208783 | 8/2005 |
| JP | 2006-185348 | 7/2006 |
| JP | 2006-293800 | 10/2006 |
| JP | 2007-219577 | 8/2007 |
| WO | WO 2006-112270 | 10/2006 |

* cited by examiner

*Primary Examiner* — Tammara Peyton (74) *Attorney, Agent, or Firm* — Finnegan, Henderson, Farabow, Garrett & Dunner, L.L.P.

(57) ABSTRACT

An information processing apparatus includes a device that performs data processing; and processors, each processor including a device driver corresponding to the device. A device driver set in correspondence with at least one processor has a resource-state holding unit that manages a resource flag indicating which processor is using or is scheduled to use resources used at the time of data processing using the device. At least one processor sets the resource flag to a flag value indicating that at least one processor is scheduled to use the resources in accordance with a schedule of at least one processor to use the device. At least one processor terminates or interrupts use of the device when at least one processor refers to the resource flag and recognizes that another processor is scheduled to use the resources during a period in which at least one processor is using the device.

6 Claims, 10 Drawing Sheets

INFORMATION PROCESSING METHOD AND COMPUTER PROGRAM COMPRISING NETWORK CARD WHEREIN A PLURALITY OF PROCESSORS SWITCHES USE OF NETWORK CARD RELATED TO SETTING OF RESOURCE FLAG

CROSS REFERENCES TO RELATED APPLICATIONS

The present invention contains subject matter related to Japanese Patent Application JP 2008-106355 filed in the Japanese Patent Office on Apr. 16, 2008, the entire contents of which are incorporated herein by reference.

BACKGROUND OF THE INVENTION

1. Field of the Invention

The present invention relates to information processing apparatuses, information processing methods, and computer programs. More particularly, the present invention relates to an information processing apparatus that has a multiprocessing structure and performs data processing using a plurality of processors, an information processing method, and a computer program.

2. Description of the Related Art

In recent years, there have been an increasing number of multiprocessor information processing apparatuses that have a plurality of processors (central processing units (CPUs)) and realize efficient data processing by performing parallel processing using the processors. However, in such a multiprocessor environment, for example, a problem may occur when device drivers corresponding to various devices, such as a network card and a video card, are simultaneously run on the processors.

For example, when the processors simultaneously run device drivers corresponding to one network card, the processors change the state of the device (network card) in accordance with the progress situations of individual processes performed by the processors. As a result, an error occurs in at least one process (e.g., data communication). As has been described above, when device drivers are simultaneously run on the processors, the device state and process progression become inconsistent, and accordingly, a failure occurs not only in the operation of the device but also in the operation of the entire system.

Some measures have been proposed to solve the foregoing problem in the multiprocessor system. One measure is a method of performing exclusive control of device access. For example, Japanese Unexamined Patent Application Publication No. 06-223047 (Toshiba Corporation) discloses a system control method that, when it turns out to be that the cause of a failure resulting from exclusive control resides in a device driver, causes that driver to be runnable only on a single processor.

Also, Japanese Unexamined Patent Application Publication No. 09-160883 (Hitachi, Ltd.) discloses a structure that, when a terminal including a plurality of processors communicates with another terminal via a network, avoids stopping of the processors due to hardware contention by setting a device driver to be allocated to a single processor at all times or on a job-by-job basis.

However, these available techniques of the related art are solving methods based on the assumption that device drivers simultaneously running on a plurality of processors are common. In other words, these are methods for solving the problem of a system with a symmetric multiprocessing (SMP) environment.

Multiprocessor systems include, besides the above-described SMP systems, asymmetric multiprocessing (ASMP) systems.

The ASMP performs processing in a multiprocessor environment in which different roles are set to a plurality of CPUs. In such an ASMP environment, for example, one main processor is provided, and at the same time, a plurality of sub-processors are provided. The processors are used in the following manner:

(1) The main processor performs processing based on the operating system (OS); and
(2) Each sub-processor executes partial, specialized processing, such as encoding/decoding, digital signal processing (DSP) specialized for sounds and images, or communication processing.

These processing functions are distributed, thereby efficiently executing various processes.

In the ASMP system, unlike the SMP system, device drivers simultaneously running on a plurality of processors are not necessarily common; device drivers with different specifications may be used in the processors. In the structure where such device drivers with different architectures are used in the processors, even if the foregoing available methods of the related art are employed, processing errors are highly likely to occur.

One specific example of the ASMP system is "Cell" developed by Sony Corporation and the like. Cell is shorthand for "Cell Broadband engine Architecture". Cell has a plurality of processor elements. That is, Cell includes the following:

(a) one main processor element (powerPC processor element (PPE)) including a main processor (power processing unit (PPU)); and
(b) multiple (e.g., eight) sub-processor elements (synergistic processor elements (SPEs)) including sub-processors (synergistic processing units (SPUs)).

These elements adopt individually different architectures.

In such an ASMP environment, device drivers on the processor elements may have different structures. Therefore, the methods disclosed in the foregoing Japanese Unexamined Patent Application Publication Nos. 06-223047 and 09-160883 for solving the problem in the SMP environment are not employable. That is, when a situation where device drivers simultaneously run on a plurality of processors occurs, the problem that not only the corresponding device but also the entire system does not operate properly occurs.

A processing example in which network communication is to be performed using a device driver corresponding to a network card in an ASMP information processing apparatus will be described. The example described below is a -processing example where the device driver corresponding to the network card is set up only on the main processor (PPU).

Figure 1:
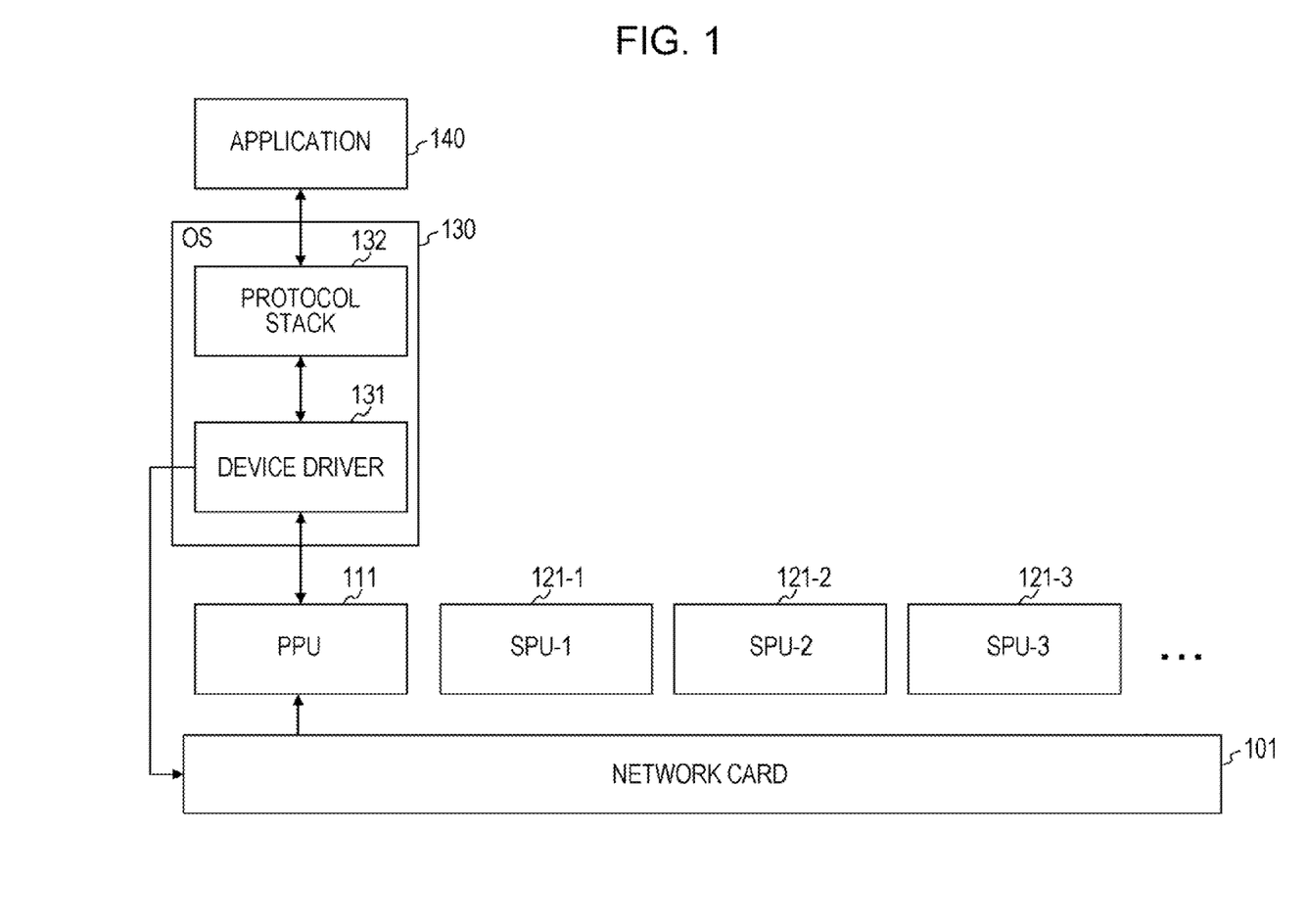
FIG. 1 is a diagram showing an example of a processing hierarchy in the case where data processing involving network communication is performed in an information processing apparatus with a multiprocessor unit.

FIG. 1 shows an example of a processing hierarchy. As shown in FIG. 1, a network card 101 that performs data communication serves as the bottom layer. Above the bottom layer, processors that perform data processing are set. A main processor (PPU) 111 is a main processor that performs the OS. Sub-processors (SPU)-n 121 are processors that perform processes individually allocated thereto.

Besides performing the OS, the main processor (PPU) 111 performs, for example, control of a program 130 including a device driver 131 corresponding to a network card and a protocol stack 132 corresponding to a communication protocol, such as Transmission Control Protocol/Internet Protocol (TCP/IP). An application 140 that requests execution of communication processing is set as the top layer. As shown in FIG. 1, the protocol stack 132 and the device driver 131 run on the main processor (PPU) 111 together with the OS. An interrupt from the network card 101 is processed in the main processor (PPU) 111.

Figure 2:
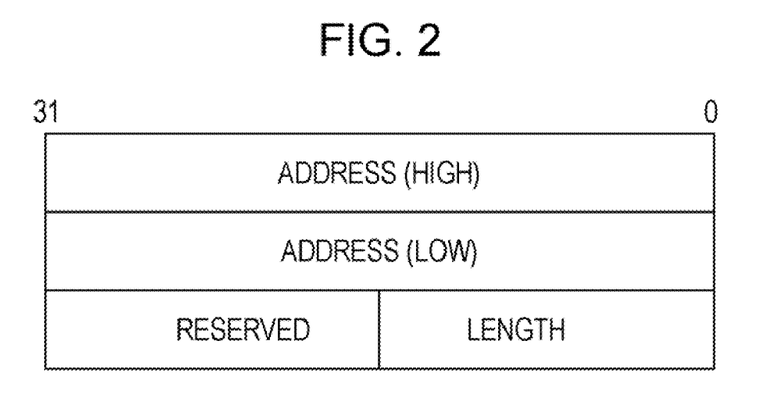
FIG. 2 is a diagram illustrating a structure example of a descriptor.

When communication processing is to be performed, packets to be sent/received are necessary to be exchanged between a network card and a memory serving as an obtaining source of data to be sent or as a storage destination of received data. In such a case, a descriptor such as that shown in FIG. 2 is used. A descriptor is identification data for memory access. For example, as shown in FIG. 2, a descriptor includes information such as an address (high) indicating the most significant 32 bits and an address (low) indicating the least significant 32 bits of a recording start address on a memory, which indicates in which place of the memory packets constituting communication data are placed, and 16-bit length information indicating the packet length.

In the information processing apparatus shown in FIG. 1, as has been described above, the main processor (PPU) 111, which is a main processor that controls the OS, processes an interrupt from the network card 101.

Figure 3:
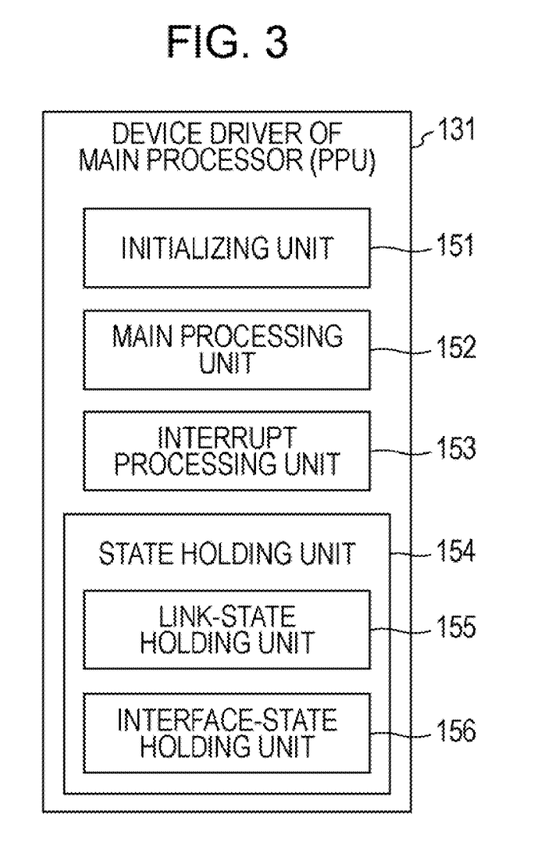
FIG. 3 is a diagram illustrating a structure example of a device driver.

FIG. 3 shows a structure example of the network-card-corresponding device driver 131 of the main processor (PPU) 111. The device driver 131 includes an initializing unit 151 that performs initialization processing in communication processing, such as reserving a memory and setting an IP address; a main processing unit 152 that performs data sending/reception processing using a network card; an interrupt processing unit 153 that controls interrupt processing of an interrupt for the main processor (PPU) 111, which is performed at the time of communication using a network card; and a state holding unit 154 including a link-state holding unit 155 that holds a state value of a connection state of a network cable and an interface-state holding unit 156 that stores information indicating whether or not a communication-processable interface has been set.

Figure 4:
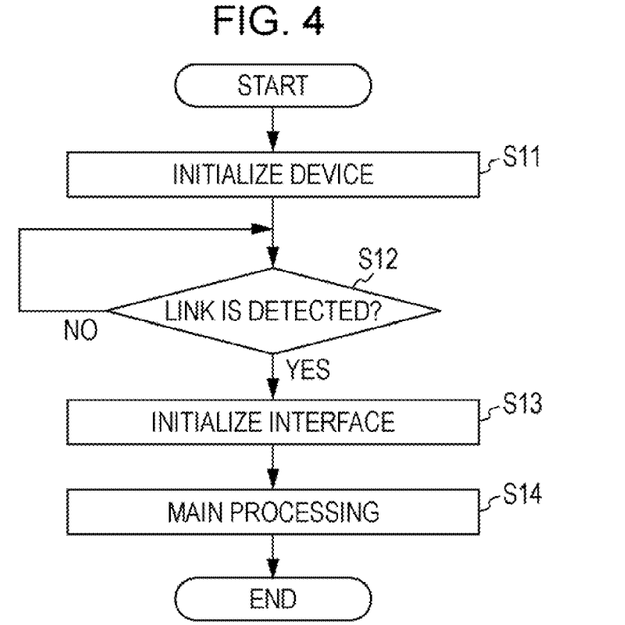
FIG. 4 is a flowchart illustrating a data processing sequence using the device driver.

FIG. 4 shows a flowchart showing the sequence of a process of activating the network-card-corresponding device driver 131 in the main processor (PPU) 111. In step S11, the device is initialized by reading/writing register values in the device. In step S12, link detection is performed to determine whether or not a network cable has been connected. When a link is detected and a connection of a network cable is determined, the flow proceeds to step S13.

In step S13, interface setting including the setting of an IP address and a maximum transmission unit (MTU) is performed. The processing in steps S11 to S13 so far is performed in the initializing unit 151 of the device driver 131 shown in FIG. 3.

The processing in step S14 is packet sending/reception processing performed in the main processing unit 152. The interrupt processing and the main processing are simultaneously performed in a time-sharing manner in the main processor (PPU) 111. With reference to the flowchart shown in FIG. 5, the flow of the processing in step S14 performed by the main processor (PPU) 111, that is, the flow of packet sending/reception, will now be described.

Figure 5:
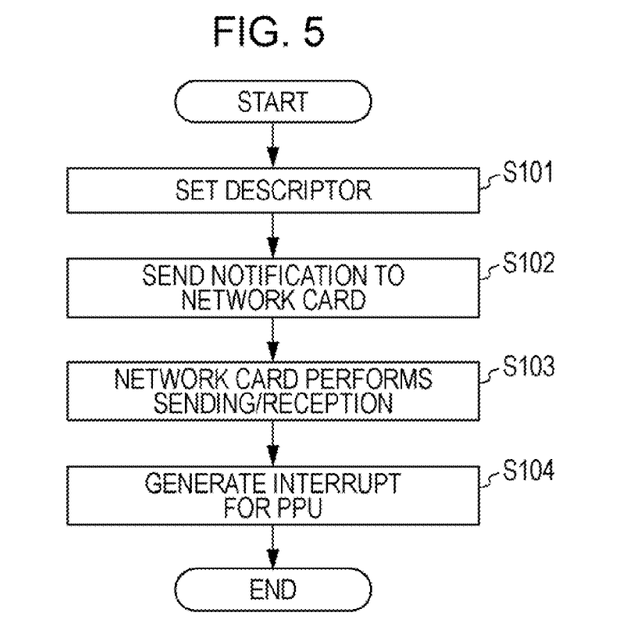
FIG. 5 is a flowchart illustrating a communication processing sequence using a device driver corresponding to a network card.

In response to a request from an application for communication processing, in step S101, the main processor (PPU) 111 reserves a memory region for sending/receiving packets and sets a descriptor corresponding to the reserved memory region in accordance with the device driver 131. In step S102, a notification of the set descriptor information is sent to the network card 101. This notification processing is performed by writing into a register in the network card 101.

In step S103, the network card 101 performs data sending/reception in accordance with the descriptor. In step S104, an interrupt is generated for the main processor (PPU) 111. In response to the interrupt, the main processor (PPU) 111 performs processing after preset communication processing, such as releasing the memory space.

The processing described with reference to FIGS. 1 to 5 is a processing example where communication is performed by setting up a device driver corresponding to a network card only on a main processor (PPU). In this manner, no problem occurs in the setting where network communication is performed by the single main processor (PPU) by using its own device driver. However, the ASMP environment includes, besides the main processor (PPU), multiple sub-processors (SPUs) having individually different architectures. Therefore, it is conceivable that processing is performed by device drivers that are individually set up on the respective processors.

In this manner, when processing is performed using, not only the main processor (PPU), but also sub-processors (SPUs) using SPU-corresponding device drivers, such as when communication using a network card as a device is performed, the foregoing problem occurs. That is, different device drivers set in correspondence with respective processors are simultaneously operated. In such a case, the problem that not only the corresponding device but also the entire system does not operate properly occurs.

SUMMARY OF THE INVENTION

It is desirable to provide an information processing apparatus, an information processing method, and a computer program that prevent errors from occurring by preventing contention of device drivers corresponding to an ASMP environment and performing use control of the device drivers and that make it possible to efficiently perform processing without giving rise to errors in processes performed by individual processors.

According to an embodiment of the present invention, there is provided an information processing apparatus including the following elements: a device that performs data processing; and a plurality of processors, each processor including a device driver corresponding to the device. A device driver that is set in correspondence with at least one of the plurality of processors has a resource-state holding unit that manages a resource flag indicating which processor is using or is scheduled to use resources used at the time of data processing using the device. At least one of the plurality of processors sets the resource flag to a flag value indicating that the at least one of the plurality of processors is scheduled to use the resources in accordance with a schedule of the at least one of the plurality of processors to use the device. At least one of the plurality of processors terminates or interrupts use of the device when the at least one of the plurality of processors refers to the resource flag and recognizes that another processor is scheduled to use the resources during a period in which the at least one of the plurality of processors is using the device.

Furthermore, each of the plurality of processors, including the device driver, may terminate or interrupt use of the device when the processor refers to the resource flag and recognizes that another processor is scheduled to use the resources during a period in which the processor is using the device. Each of the plurality of processors may set the resource flag to a flag value indicating that the processor is scheduled to use the resources in accordance with the processor's schedule to use the device.

Furthermore, the plurality of processors may include one main processor and a plurality of sub-processors. A device driver that is set in correspondence with the main processor may include the resource-state holding unit, which manages the resource flag.

Furthermore, the device may be a network card. Each of the plurality of processors may include a device driver corresponding to the network card, and the processor may switch use of the device in accordance with a setting of the resource flag.

Furthermore, the plurality of processors may have asymmetric multiprocessing structures with individually different architectures.

According to an embodiment of the present invention, there is provided an information processing apparatus including the following elements: a device that performs data processing; and a plurality of processors, each processor including a device driver corresponding to the device. The device includes processor-corresponding registers corresponding to the plurality of processors, respectively. Each of the plurality of processors performs, in response to a data processing request for the device, writing of identification information indicating the presence of the data processing request into a corresponding one of the processor-corresponding registers. The device obtains items of identification information from the registers and sequentially performs data processing in response to data processing requests identified by the items of identification information.

Furthermore, the device may be a network card. The network card may obtain data to be sent from a memory in accordance with a descriptor set in correspondence with a communication packet, and send the data. Each of the plurality of processors may individually set, in a descriptor region of the memory, a descriptor corresponding to a data-to-be-sent queue set in a data region of the memory, and store a descriptor identifier of the set descriptor in a corresponding one of the registers in the network card. The network card may obtain descriptor identifiers from the registers, sequentially obtain descriptors identified by the descriptor identifiers from the descriptor region, obtain data corresponding to the obtained descriptors from the data region, and send the obtained data.

Furthermore, the plurality of processors may have asymmetric multiprocessing structures with individually different architectures.

According to an embodiment of the present invention, there is provided an information processing method performed by an information processing apparatus. The information processing apparatus includes a device that performs data processing and a plurality of processors, each processor including a device driver corresponding to the device. A device driver that is set in correspondence with at least one of the plurality of processors has a resource-state holding unit that manages a resource flag indicating which processor is using or is scheduled to use resources used at the time of data processing using the device. The method includes the steps of: setting, with at least one of the plurality of processors, the resource flag to a flag value indicating that the at least one of the plurality of processors is scheduled to use the resources in accordance with a schedule of the at least one of the plurality of processors to use the device; and terminating or interrupting, with at least one of the plurality of processors, use of the device when the at least one of the plurality of processors refers to the resource flag and recognizes that another processor is scheduled to use the resources during a period in which the at least one of the plurality of processors is using the device.

According to an embodiment of the present invention, there is provided an information processing method performed by an information processing apparatus. The information processing apparatus includes a device that performs data processing and a plurality of processors, each processor including a device driver corresponding to the device. The device includes processor-corresponding registers corresponding to the plurality of processors, respectively. The method includes the steps of: performing, with each of the plurality of processors, in response to a data processing request for the device, writing of identification information indicating the presence of the data processing request into a corresponding one of the processor-corresponding registers; and obtaining, with the device, items of identification information from the registers and sequentially performing data processing in response to data processing requests identified by the items of identification information.

According to an embodiment of the present invention, there is provided a computer program for causing an information processing apparatus to perform information processing. The information processing apparatus includes a device that performs data processing and a plurality of processors, each processor including a device driver corresponding to the device. A device driver that is set in correspondence with at least one of the plurality of processors has a resource-state holding unit that manages a resource flag indicating which processor is using or is scheduled to use resources used at the time of data processing using the device. The computer program includes the steps of: causing at least one of the plurality of processors to set the resource flag to a flag value indicating that the at least one of the plurality of processors is scheduled to use the resources in accordance with a schedule of the at least one of the plurality of processors to use the device; and causing at least one of the plurality of processors to terminate or interrupt use of the device when the at least one of the plurality of processors refers to the resource flag and recognizes that another processor is scheduled to use the resources during a period in which the at least one of the plurality of processors is using the device.

According to an embodiment of the present invention, there is provided a computer program for causing an information processing apparatus to perform information processing. The information processing apparatus includes a device that performs data processing and a plurality of processors, each processor including a device driver corresponding to the device. The device includes processor-corresponding registers corresponding to the plurality of processors, respectively. The computer program includes the steps of: causing each of the plurality of processors to perform, in response to a data processing request for the device, writing of identification information indicating the presence of the data processing request into a corresponding one of the processor-corresponding registers; and causing the device to obtain items of identification information from the registers and sequentially perform data processing in response to data processing requests identified by the items of identification information.

The program according to the embodiment of the present invention is a computer program that can be provided by a storage medium or a communication medium that provides the program in a computer-readable format to a general computer system that can execute various program codes. By providing such a program in a computer-readable format, processing in accordance with the program can be realized on the computer system.

Further objects, features, and advantages of the embodiments of the present invention will become apparent from detailed description based on the later-described embodiments of the present invention and the appended drawings. The term "system" in this specification is a logical set of a plurality of apparatuses and is not limited to the structure in which these apparatuses are housed in a single housing.

According to the embodiments of the present invention, in a multiprocessor environment including a plurality of processors, even when the plurality of processors activate device drivers corresponding to one device, processing performed by the individual processors to use the device can be reliably performed by preventing contention of use of the device and resources such as a memory necessary at the time of using the device. For example, use control is performed in which the use state of the device can be checked by each processor on the basis of a flag. With this structure, device use processing can be reliably performed by each processor.

DESCRIPTION OF THE PREFERRED EMBODIMENTS

Hereinafter, an information processing apparatus, an information processing method, and a computer program according to an embodiment of the present invention will be described.

The information processing apparatus according to the embodiment of the present invention is an apparatus that has a plurality of processors (CPUs) and performs various types of data processing in an ASMP environment in which the individual processors perform their unique processes. A structure example of the information processing apparatus according to the embodiment of the present invention will be described with reference to FIG. 6.

Figure 6:
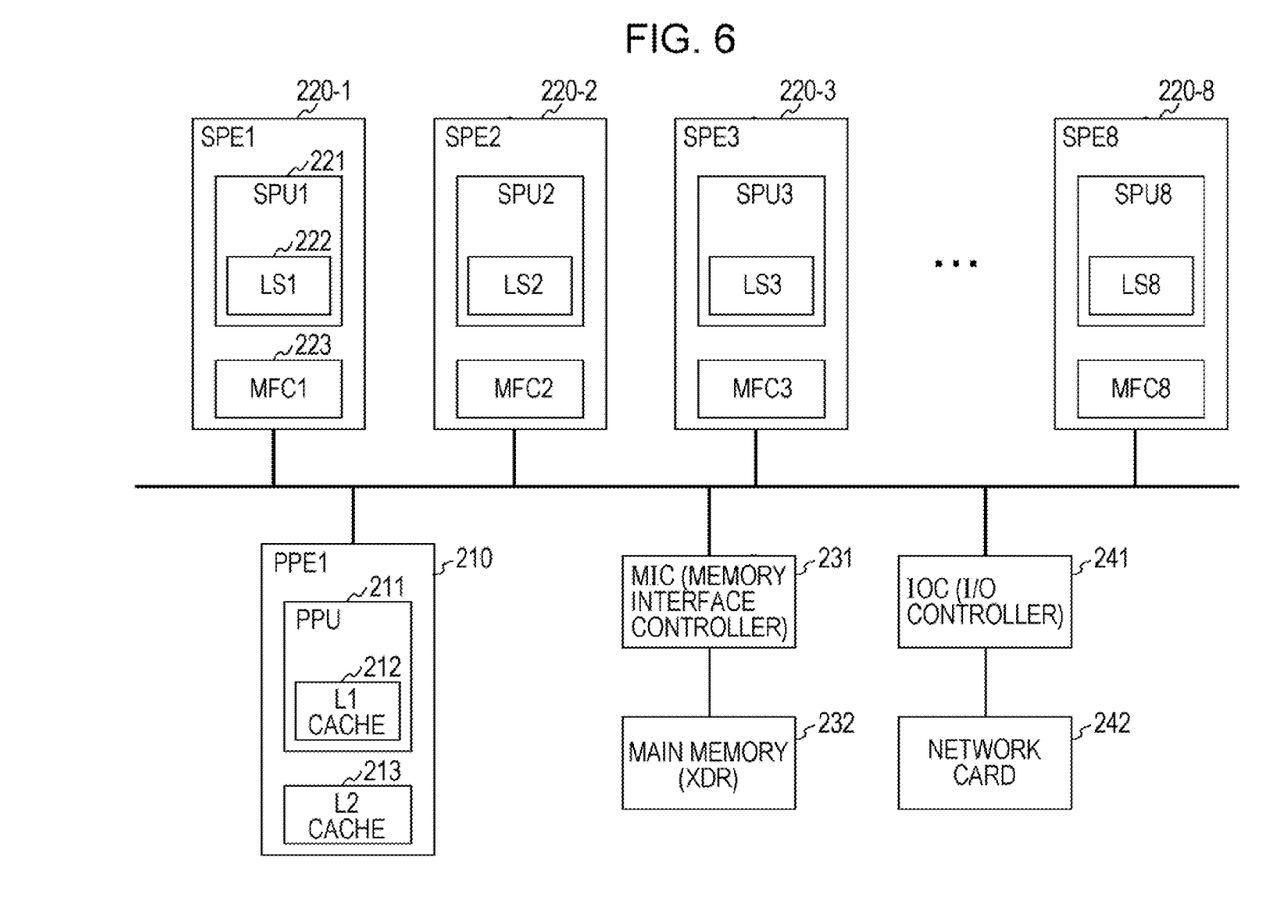
FIG. 6 is a diagram illustrating a structure example of an information processing apparatus according to an embodiment of the present invention.

Referring to FIG. 6, the information processing apparatus according to the embodiment of the present invention includes one main processor element (PPE) 210 including a main processor (PPU) 211 and a plurality of sub-processor elements (SPEs) 220-1 to 220-8 including sub-processors (SPUs) 221. These processor elements adopt individually different architectures. In the example shown in FIG. 6, the information processing apparatus has eight sub-processor elements (SPEs). However, any number of sub-processor elements can be provided.

As shown in FIG. 6, the main processor (PPU) 211 is included in the main processor element (PPE) 210, and the eight sub-processors (SPUs) 221 are included in the respective sub-processor elements (SPEs) 220. For example, the main processor (PPU) 211 functions as a processor that controls data processing including the 0, and the eight sub-processors (SPUs) 221 are set as sub-processors that perform processing in accordance with their individual roles.

The main processor element (PPE) 210 includes an L1 cache 212 and an L2 cache 213 as two-level cache memories. The sub-processor elements (SPEs) 220 each contain a memory space called a local store (LS) 222 that operates at a speed equivalent to that of the L1 cache 212. The sub-processor elements (SPEs) 220 each access a main memory 232 (in external data representation (XDR) format), which is performed as direct memory access (DMA) mainly via a corresponding one of memory flow controllers (MFCs) 223. As shown in FIG. 6, the main memory 232 is connected via a memory interface controller (MIC) 231. A network card 242 serving as a communication unit is connected via an input/output controller (IOC) 241.

Although only the network card 242 is shown as a device connected via the input/output controller (IOC) 241 in the structure shown in FIG. 6, various other devices including a video card are connectable. Each processor element has a device driver corresponding to each of these devices, activates the device driver, and performs processing corresponding to the device.

Hereinafter, a processing example in the case where device drivers corresponding to the network card 242 serving as a communication unit are individually activated in a plurality of processors and processing is performed will be described. That is, in this processing example, device drivers corresponding to the network card 242 are set up on a plurality of processors (the main processor (PPU) 211 and the sub-processors (SPUs) 221). These device drivers are activated and processing is performed.

The main processor (PPU) 211 and the sub-processors (SPUs) 221 activate the respective device drivers and perform communication using the network card 242.

Figure 7A:
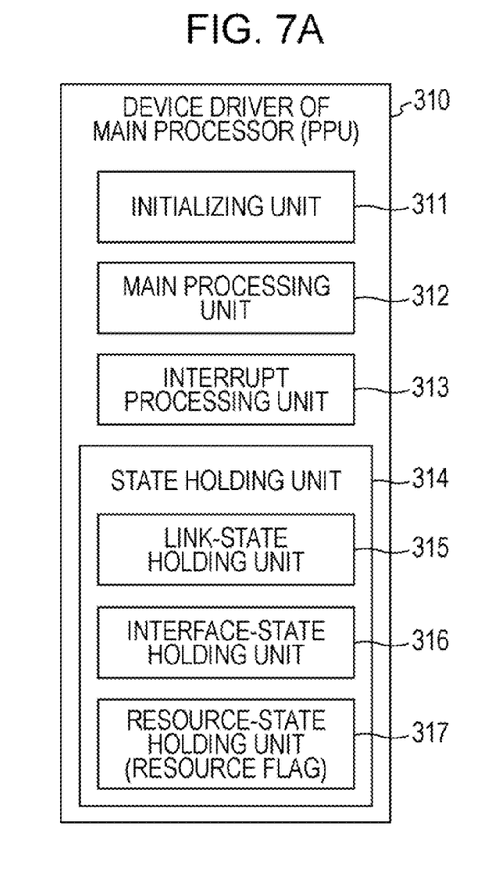
FIGS. 7A and 7B are diagrams illustrating a structure example of device drivers of the information processing apparatus according to the embodiment of the present invention.
Figure 7B:
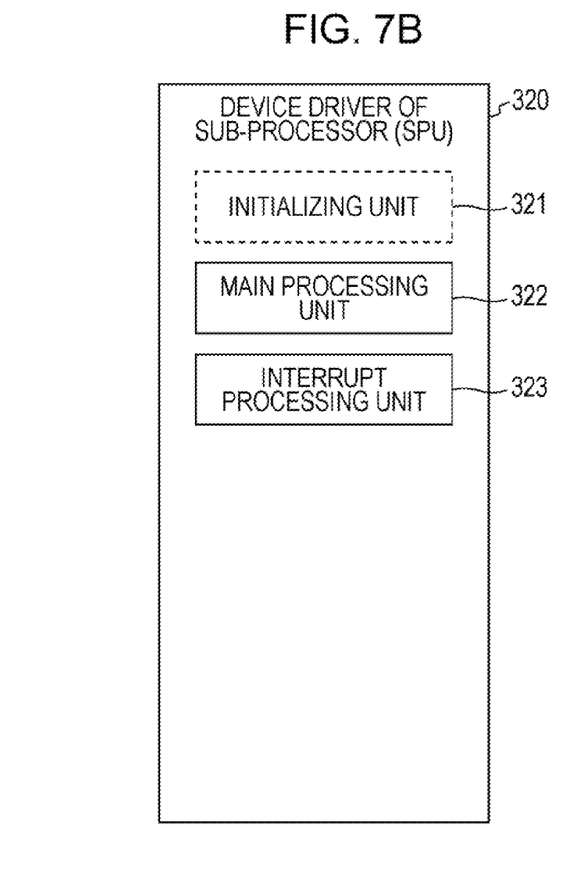

FIGS. 7A and 7B show a structure example of device drivers applied to the information processing apparatus according to the embodiment of the present invention. FIGS. 7A and 7B show a structure example of the following:

(a) a device driver 310 set up on the main processor (PPU) 211; and (b) a device driver 320 set up on each of the sub-processors (SPUs) 221.

The device drivers 310 and 320 are stored in local memories of the respective processor elements. Since the local store (LS) 222 which is a local memory of each of the sub-processors (SPUs) 221 has a small size, it is preferable to make elements constituting the device driver 320 as small as possible. Therefore, it is preferable to set the device driver 320 corresponding to the sub-processor (SPU) 221 to have no elements that perform processing shared by the device driver 310 of the main processor (PPU) 211, such as an initializing unit and a state holding unit.

The device driver 310 corresponding to a network card, which is set up on the main processor (PPU) 211 and shown in FIG. 7A, will be described.

The device driver 310 includes an initializing unit 311 that performs initialization processing in communication processing, such as reserving a memory and setting an IP address; a main processing unit 312 that performs data sending/reception processing using a network card; an interrupt processing unit 313 that controls interrupt processing of an interrupt for the main -processor (PPU) 211, which is performed at the time of communication using a network card; and a state holding unit 314 that records various state values.

The state holding unit 314 includes a link-state holding unit 315 that holds a state value of a connection state of a network cable, and an interface-state holding unit 316 that stores information indicating whether or not a communication-processable interface has been set.

The structure so far is similar to that of a device driver described above with reference to FIG. 3. The state holding unit 314 of the device driver 310 shown in FIG. 7A further includes a resource-state holding unit 317 that sets a resource flag indicating a use state of the apparatus's resources used for communication processing, such as resources including a memory.

The resource-state holding unit 317 is set as follows:

A flag set value indicating whether communication processing using the network card 242 is being performed or is scheduled to be performed under control of the main processor (PPU) 211, which is indicated as "resource flag=1"; or A flag set value indicating whether communication processing using the network card 242 is being performed or is scheduled to be performed under control of the sub-processor (s) (SPU(s)) 221, which is indicated as "resource flag=0".

When device drivers are set so as to correspond to only two processors, the flag information may be 1-bit data that can be set to two state values, 0 and 1. However, if device drivers are set up on three or more processors, a flag having two bits or more is set. That is, the value of a flag is set in correspondence with each processor, and accordingly each processor is identifiable on the basis of the flag value.

In such a manner, the resource-state holding unit 317 stores information indicating which processor is using or is scheduled to use resources used by the device, such as, in the case of communication processing, a memory serving as a region for storing communication data. A memory region in which the resource flag is set is a memory region that can be accessed and referred to by both the main processor (PPU) 211 and the sub-processors (SPUs) 221.

For example, when one of the sub-processors (SPUs) 221 wishes to start communication while the main processor (PPU) 211 is performing communication, the sub-processor (SPU) 221 rewrites the resource flag. In a period in which the main processor (PPU) 211 is performing communication processing and occupying the resources, the main processor (PPU) 211 verifies the resource flag of the resource-state holding unit 317 at certain intervals. That is, the main processor (PPU) 211 performs polling and determines whether or not the resource flag has been rewritten by the sub-processor (SPU) 221.

When it is determined that the resource flag has been rewritten by the sub-processor (SPU) 221, the main processor (PPU) 211 determines that there is a request from the sub-processor (SPU) 221 to use the resources, terminates or interrupts communication at a predetermined timing, and releases the resources. After the resources have been released, the sub-processor (SPU) 221 performs communication.

The device driver 320 corresponding to a network card, which is set up on each of the sub-processors (SPUs) 221 and shown in FIG. 7B, will be described.

As has been described above, since the local store (LS) 222 which is a local memory of each of the sub-processors (SPUs) 221 has a small size, it is preferable to set the device driver 320 of the sub-processor (SPU) 221 to have no processing units that perform processing shared by the device driver 310 of the main processor (PPU) 211. FIG. 7B shows a structure example of the device driver 320 including an initializing unit 321 that performs initialization processing in communication processing, such as reserving a memory and setting an IP address; a main processing unit 322 that performs data sending/reception processing using a network card; and an interrupt processing unit 313 that controls interrupt processing of an interrupt for the sub-processor (SPU) 221, which is performed at the time of communication using a network card. Alternatively, the device driver 320 of the sub-processor (SPU) 221 may include no initializing unit 321.

Figure 8:
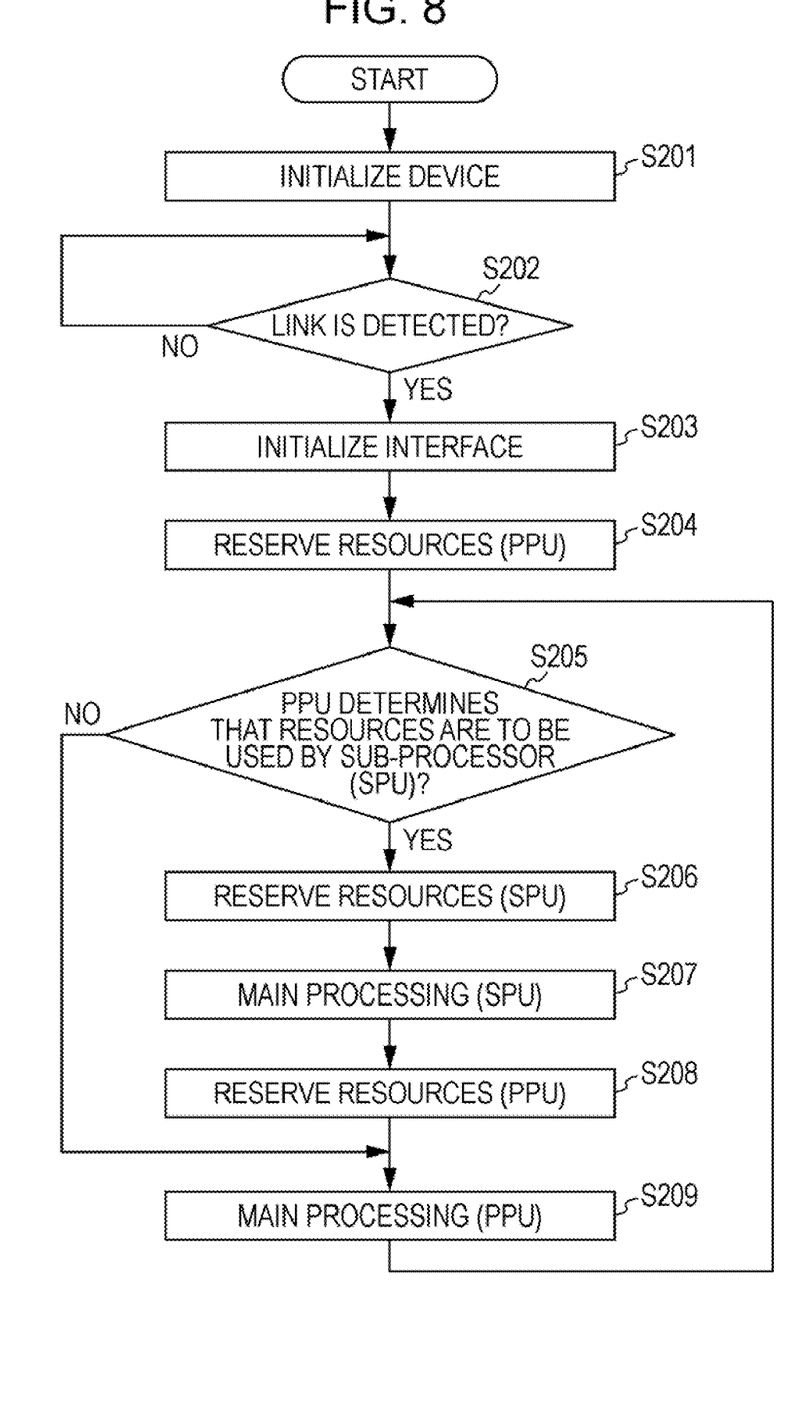
FIG. 8 is a flowchart illustrating a data processing sequence using the device drivers in the information processing apparatus according to the embodiment of the present invention.

Referring now to the flowchart shown in FIG. 8, the sequence of a process performed in the case where the main processor (PPU) 211 and the sub-processor (SPU) 221 simultaneously activate their device drivers 310 and 320 and perform communication processing will be described.

In step S201, the main processor (PPU) 211 performs initialization processing of a device (network card 242 in this example). For example, the initialization processing includes reading of information from the network card 242 and checking processing of communication settings.

In step S202, link detection is performed to determine whether or not a network cable has been connected. When a link is detected and it is thus determined that a network cable has been connected, the flow proceeds to step S203.

In step S203, interface initialization setting including the setting of an IP address and a MTU is performed.

In step S204, reserve processing of resources is performed. For example, reserve processing of resources necessary in communication processing, such as reserve processing of a memory region for storing packets to be sent/received, is performed. Together with the reserve processing of resources, the flag in the resource-state holding unit 317 of the state holding unit 314 of the device driver 310 corresponding to the main processor (PPU) 211, which is shown in FIG. 7A, is set. That is, communication processing using the network card 242 is performed under control of the main processor (PPU) 211, and a resource flag indicating that the resources are occupied for communication processing of the main processor (PPU) 211, such as "resource flag=1", is set.

The processing in steps S201 to S204 so far is performed in the initializing unit 311 of the device driver 310 shown in FIG. 7A.

After the resource flag of the resource-state holding unit 317 is set in step S204, the device driver 310 of the main processor (PPU) 211 periodically checks the setting of the resource flag. When it is determined that the set value of the resource flag is a value indicating that the resources are occupied for communication processing of the main processor (PPU) 211 (NO in the determination in step S205), the flow proceeds to step S209, and main processing, that is, communication processing under control of the device driver 310 of the main processor (PPU) 211, is performed. This processing is performed by the main processing unit 312 of the device driver 310 shown in FIG. 7A. This processing is, for example, communication processing using packet sending/reception processing.

When it is determined in step S205 that the resource flag is set to a value indicating that the resources are being occupied or are scheduled to be occupied for communication processing of the sub-processor (SPU) 221 (e.g., "resource flag=0"), the main processor (PPU) 211 terminates or interrupts communication at a timing set by the main processor (PPU) 211. Thereafter in step S206, the device driver 320 of the sub-processor (SPU) 221 performs reserve processing of the resources.

Thereafter in step S207, communication processing is performed under control of the device driver 320 of the sub-processor (SPU) 221. This processing is performed by the main processing unit 322 of the device driver 320 shown in FIG. 7B. This processing is, for example, communication processing using packet sending/reception processing.

As with the main processor (PPU) 211, the sub-processor (SPU) 221 periodically checks the setting of the resource flag. When the set value of the resource flag has been rewritten by the main processor (PPU) 211, that is, when the resource flag has been set to a value indicating that the resources are scheduled to be used for communication performed by the main processor (PPU) 211 (e.g., "resource flag=1"), the sub-processor (SPU) 221 terminates or interrupts communication at a timing set by the sub-processor (SPU) 221. Thereafter in step S208, the device driver 310 of the main processor (PPU) 211 performs reserve processing of the resources. In step S209, main processing, that is, communication processing under control of the device driver 310 of the main processor (PPU) 211, is performed. This processing is performed by the main processing unit 312 of the device driver 310 shown in FIG. 7A. This processing is, for example, communication processing using packet sending/reception processing.

In such a manner, in the processing in accordance with the embodiment of the present invention, since the processors individually rewrite and refer to the resource flag, data processing (communication processing in this example) using the same device (network card in this example) can be set to be performed in only one of the processors in a time-sharing manner. In addition, the resources can be reliably reserved.

To simplify the processing, for example, when the device driver 320 of the sub-processor (SPU) 221 wishes to reserve resources, the device driver 310 of the main processor (PPU) 211 may be set to release the resources at all times. Alternatively, setting may be set so that, only when the link is down, conditional processing is performed in which, for example, switching from the device driver 310 of the main processor (PPU) 211 to the device driver 320 of the sub-processor (SPU) 221 is allowed. In such a manner, setting may be set to switch a processor that performs processing using the device under a certain condition.

For example, the following structure is feasible.

In a device driver set in correspondence with at least one of a plurality of processors, a resource-state holding unit that manages a resource flag indicating which processor is using or is scheduled to use resources used for data processing using the device is set.

Furthermore, at least one of the plurality of processors sets the resource flag to a flag value indicating that the at least one of the plurality of processors is scheduled to use the resources in accordance with a schedule of the at least one of the plurality of processors to use the device.

Furthermore, at least one of the plurality of processors terminates or interrupts use of the device when the at least one of the plurality of processors refers to the resource flag and recognizes that another processor is scheduled to use the resources during a period in which the at least one of the plurality of processors is using the device.

With the foregoing structure, the device can be prevented from being used by a plurality of processors, and contention of use of resources can be prevented.

The example described with reference to FIG. 7B is a structure example in which the device driver 320 of the sub-processor (SPU) 221 does not include an initializing unit or a state holding unit. However, these processing units may be set in the device driver 320 of the sub-processor (SPU) 221, and initialization processing and state-holding processing may be performed on the device driver side of the sub-processor (SPU) 221. Alternatively, such processing may be performed by both the device driver 310 of the main processor (PPU) 211 and the device driver 320 of the sub-processor (SPU) 221.

Other Embodiments

In the foregoing embodiment, only one of the main processor (PPU) 211 and the sub-processor (SPU) 221 performs processing using the device, and accordingly, processing contention is avoided. That is, when requests for using the device are given at the same time, one processor terminates or interrupts processing, enters standby, and then starts processing.

When the information processing apparatus is capable of setting a plurality of DMA descriptors for one DMA channel, the device driver 310 of the main processor (PPU) 211 and the device driver 320 of the sub-processor (SPU) 221 can simultaneously control the device. A structure example in which a plurality of DMA descriptors are set for one DMA channel is described in Japanese Unexamined Patent Application Publication No. 2006-293800, which is a patent application previously filed by the present assignee. By adopting the structure described in this publication, a plurality of DMA descriptors can be set for one DMA channel.

Figure 9:
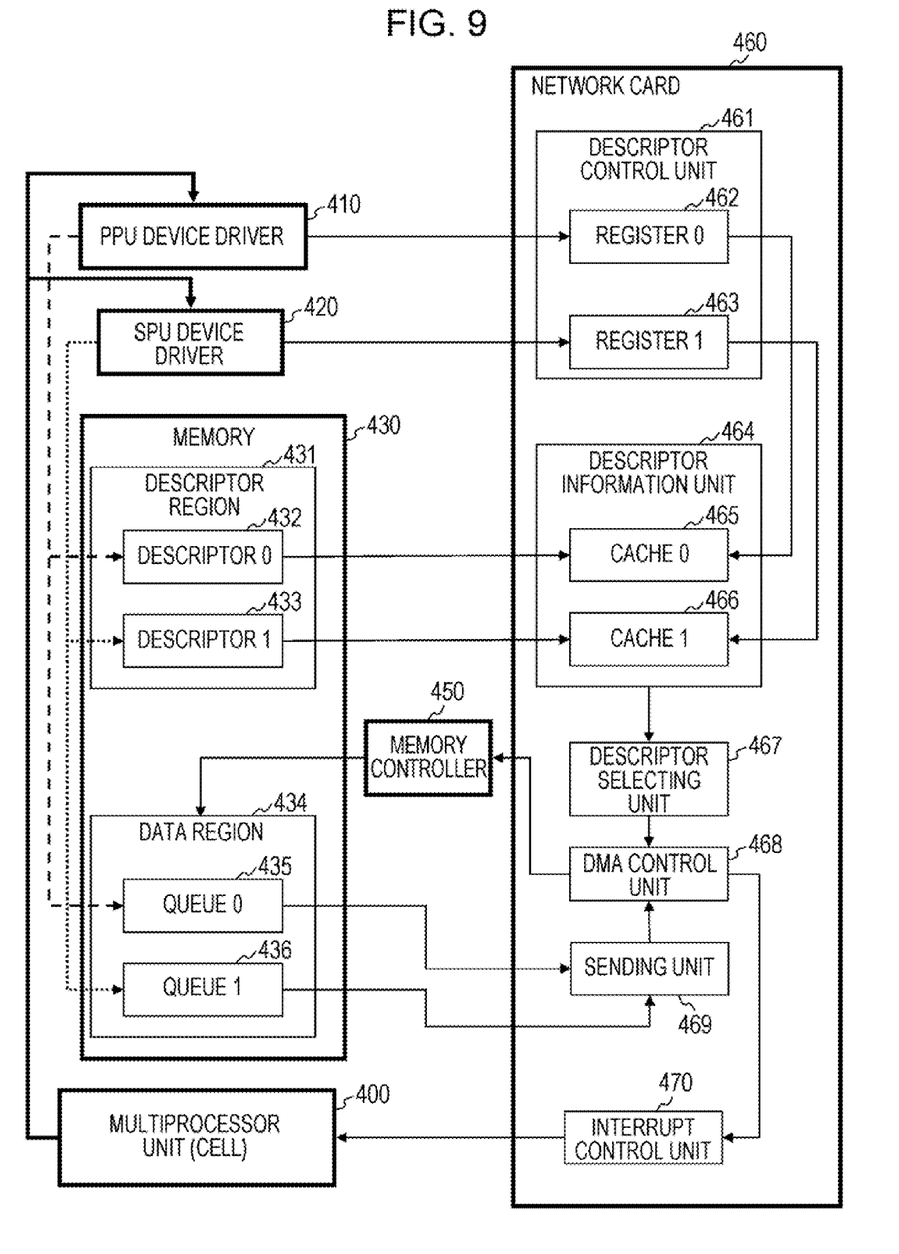
FIG. 9 is a diagram illustrating a structure example and processing of the information processing apparatus according to the embodiment of the present invention.

Referring to FIG. 9, a processing example in the case where this structure is used will be described. FIG. 9 shows a partial structure of an information processing apparatus similar to that described above with reference to FIG. 6, that is, an ASMP information processing apparatus.

FIG. 9 shows the following elements:
(1) a plurality of processors similar to those described above with reference to FIG. 6, that is, a multiprocessor unit (Cell) 400 including one main processor (PPU) and a plurality of sub-processors (SPUs);
(2) a PPU device driver 410 (corresponding to the device driver 310 shown in FIG. 7A) corresponding to the main processor (PPU);
(3) an SPU device driver 420 (corresponding to the device driver 320 shown in FIG. 7B) corresponding to each sub-processor (SPU);
(4) a memory 430 used in communication processing performed via a network card 460;
(5) a memory controller 450; and
(6) the network card 460, which is a device applied to communication processing.

A descriptor region 431 and a data region 434 that is a region for storing communication data are set in the memory 430.

A descriptor-0 432 corresponding to the PPU device driver 410 and a descriptor-1 433 corresponding to the SPU device driver 420 are individually set in the descriptor region 431.

Figure 10:
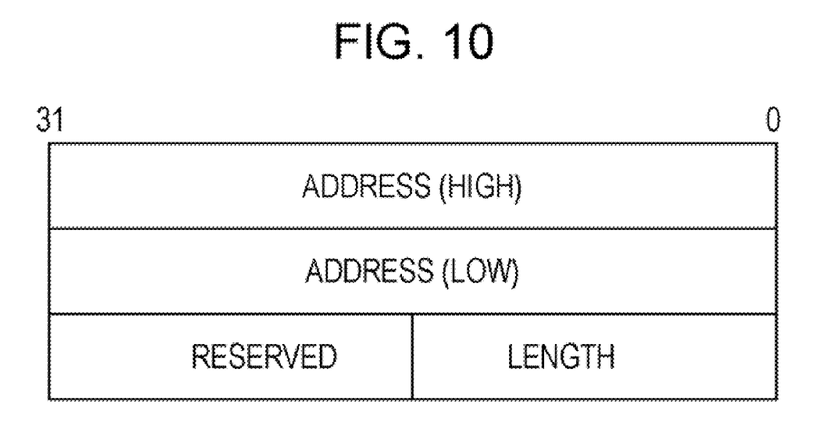
FIG. 10 is a diagram illustrating a structure example of a descriptor.

A descriptor is data describing information of each of packets constituting data to be sent. FIG. 10 shows an example of a descriptor. A descriptor includes information such as an address (high) indicating the most significant 32 bits and an address (low) indicating the least significant 32 bits of a recording start address on the memory 430, and 16-bit length information indicating the packet length.

The PPU device driver 410 records information of each of packets constituting data to be sent as the descriptor-0 432 in the descriptor region 431 of the memory 430. The SPU device driver 420 records information of each of packets constituting data to be sent as the descriptor-1 433 in the descriptor region 431 of the memory 430.

Figure 11:
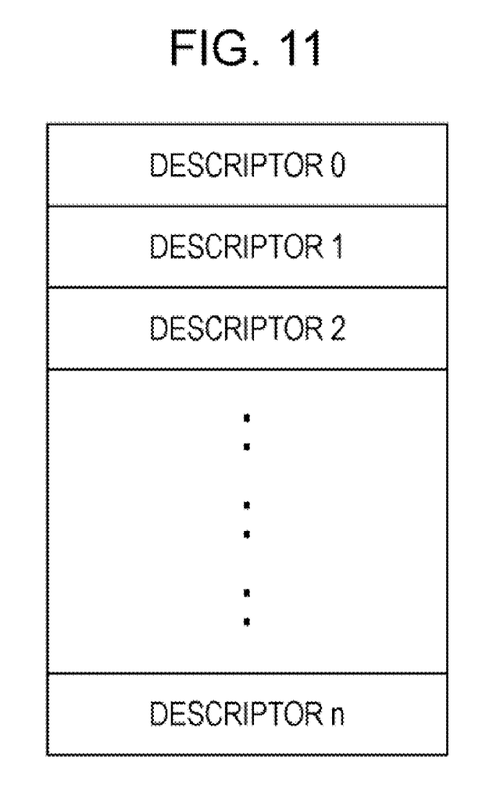
FIG. 11 is a diagram illustrating a structure example of descriptors stored in a memory of the information processing apparatus according to the embodiment of the present invention.

Descriptors corresponding to a plurality of communication packets are successively arranged in the descriptor region 431 of the memory 430. For example, as shown in FIG. 11, descriptors 0 to n are recorded in the descriptor region 431 of the memory 430.

In the information processing apparatus shown in FIG. 9, the PPU device driver 410 and the SPU device driver 420 notify a descriptor control unit 461 in the network card 460 of descriptors that have become available, that is, the numbers (0 to n) of descriptors stored in the descriptor region 431. The numbers (0 to n) of descriptors that have become available are stored in a register-0 462 and a register-1 463 of the descriptor control unit 461. By updating the register values, the device drivers 410 and 420 can notify the network card 460 of which descriptors are available.

The main processor (PPU) or the sub-processor (SPU) in the multiprocessor unit 400 causes a main processing unit of the PPU device driver 410 or the SPU device driver 420 to perform processing and output a queue-0 435 or a queue-1 436 of data packets to be sent, which are stored in the data region 434 of the memory 430, to a sending unit 469 of the network card 460.

The network card 460 includes the descriptor control unit 461, a descriptor information unit 464, a descriptor selecting unit 467, a DMA control unit 468, the sending unit 469, and an interrupt control unit 470.

The descriptor control unit 461 includes the register-0 462 corresponding to the PPU device driver 410 and the register-1 463 corresponding to the SPU device driver 420. The descriptor control unit 461 records, among the numbers of available descriptors, which are notified from each device driver, the number of a descriptor corresponding to the PPU device driver 410 in the register-0 462, and the number of a descriptor corresponding to the SPU device driver 420 in the register-1 463.

The descriptor information unit 464 includes a cache-0 465 and a cache-1 466. On the basis of the number recorded in the register-0 462 of the descriptor control unit 461, the descriptor information unit 464 obtains an available descriptor from among descriptors stored in the descriptor region 431 of the memory 430 and records the obtained descriptor in the cache-0 465. Also, on the basis of the number recorded in the register-1 463 of the descriptor control unit 461, the descriptor information unit 464 obtains an available descriptor from the descriptor region 431 of the memory 430 and records the obtained descriptor in the cache-1 466.

The descriptor selecting unit 467 selects one of the cache-0 465 and the cache-1 466 in the descriptor information unit 464 in accordance with a certain rule, reads the descriptor recorded in the selected cache, and outputs the descriptor to the DMA control unit 468. The cache-0 465 or the cache-1 466 from which a descriptor has been read is cleared by the descriptor information unit 464. The certain rule is a rule such that, for example, when it has been set to record, in the queue-0 435, data that should be preferentially sent, the cache-0 465 is selected if a descriptor is recorded in the queue-0 435; only when no descriptor is recorded in the cache-0 465, the cache-1 466 is selected.

The DMA control unit 468 reads a recording start address and a packet length described in the descriptor input from the descriptor selecting unit 467, notifies the memory controller 450 of the recording start address and the packet length, and requests the memory controller 450 to perform DMA. Furthermore, when the DMA control unit 468 receives, from the descriptor information unit 464, a notification indicating that there exists no available descriptor, and receives, from the sending unit 469, a notification indicating termination of DMA on the basis of the last available descriptor, the DMA control unit 468 notifies the interrupt control unit 470 of the fact that DMA is terminated.

The sending unit 469 sends data to be sent in increments of a packet, which is transferred using DMA from the memory 430 under control of the memory controller 450, via a network. When the interrupt control unit 470 receives a notification indicating termination of DMA from the DMA control unit 468, the interrupt control unit 470 notifies the multiprocessor unit 400 of the fact that DMA is terminated.

Figure 12:
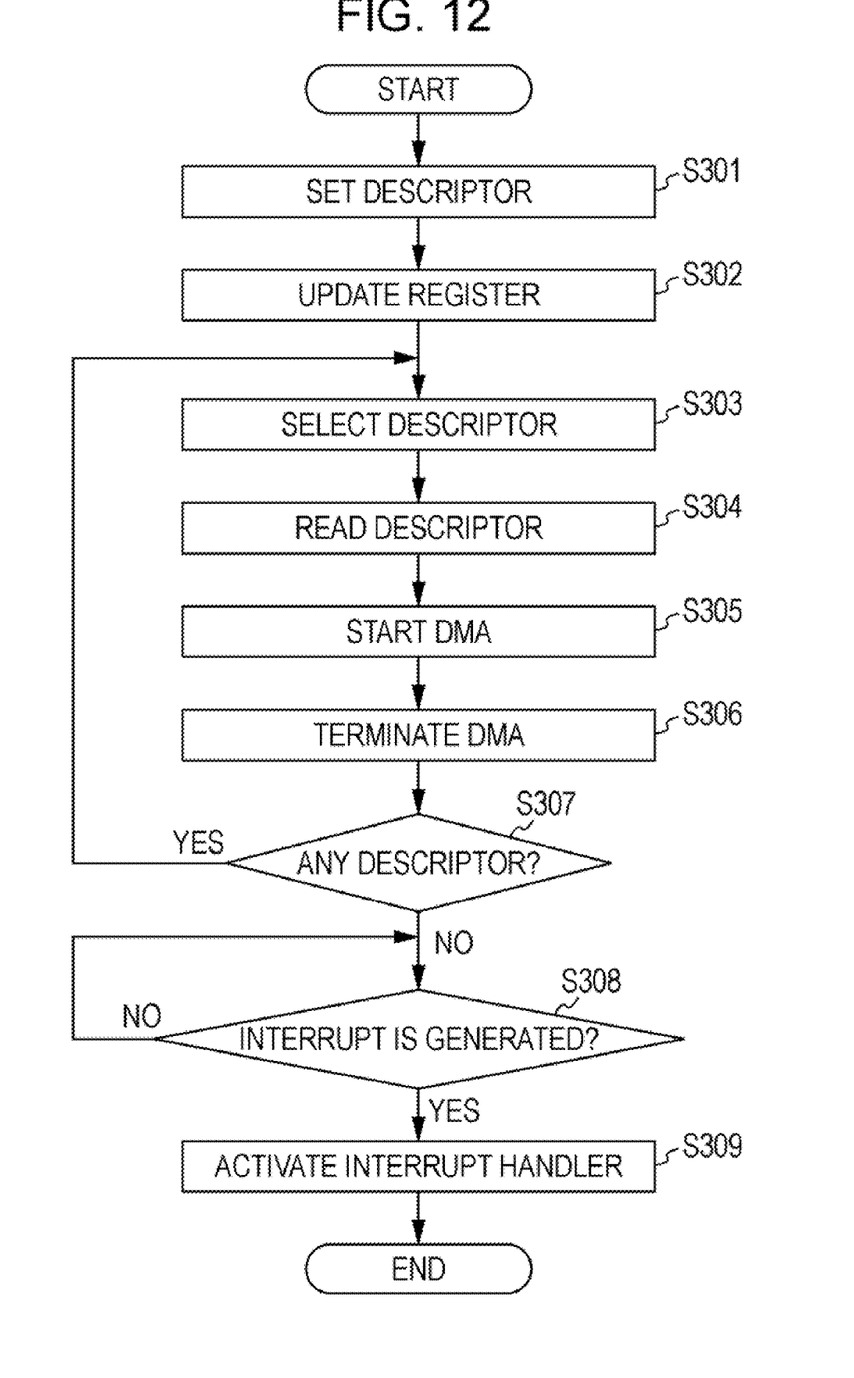
FIG. 12 is a flowchart illustrating a data processing sequence using the device drivers in the information processing apparatus according to the embodiment of the present invention.

Referring now to the flowchart shown in FIG. 12, a packet sending process will be described. In step S301, the PPU device driver 410 or the SPU device driver 420 sets, in the descriptor region 431 of the memory 430, a descriptor corresponding to a queue of data to be sent, which is set in the data region 434 of the memory 430.

In step S302, the PPU device driver 410 or the SPU device driver 420 notifies the descriptor control unit 461 in the network card 460 of the number of the descriptor that has become available, that is, the number of the descriptor set by the processing in step S301, and updates the value in the register-0 462 or the register-1 463 of the descriptor control unit 461. That is, the number of the available descriptor is recorded in a corresponding one of the register-0 462 and the register-1 463. Furthermore, the descriptor information unit 464 obtains the available descriptor from the descriptor region 431 provided in the memory 430, on the basis of the register value in the descriptor control unit 461, and records the descriptor in a corresponding one of the cache-0 465 and the cache-1 466.

In step S303, the descriptor selecting unit 467 selects one of the cache-0 465 and the cache-1 466 in the descriptor information unit 464. In step S304, the descriptor selecting unit 467 reads the descriptor from the selected cache and outputs the descriptor to the DMA control unit 468.

In step S305, the DMA control unit 468 reads a recording start address and a packet length described in the descriptor input from the descriptor selecting unit 467, notifies the memory controller 450 of the recording start address and the packet length, and starts DMA. The memory controller 450 transfers data having a size equivalent to the packet length, starting from the recording start address sent from the data region 434 of the memory 430, to the sending unit 469 using DMA. The sending unit 469 sends the DMA-transferred data to be sent in increments of a packet via a network. When termination of DMA in step S306 is determined by performing this processing, in step S307, the descriptor information unit 464 determines whether there still exists a descriptor yet to be obtained, among descriptors corresponding to numbers stored in the register-0 462 and the register-1 463. When it is determined that there still exists a yet-to-be-obtained descriptor, the flow returns to step S303, and DMA and sending processing of data corresponding to the yet-to-be-obtained descriptor is performed.

When it is determined in step S307 that there are no more yet-to-be-obtained descriptors, the flow proceeds to step S308. In step S308, a notification is sent to the interrupt control unit 470, and an interrupt for the main processor (PPU) in the multiprocessor unit 400 is generated. When the generation of the interrupt is determined, in step S309, the main processor (PPU) determines whether the interrupt is caused by processing in the device driver 410 of the main processor (PPU) or the device driver 420 of the sub-processor (SPU), activates an interrupt handler in the corresponding device driver, and releases memory space that has been used by a sending-completed packet.

The processing examples described with reference to FIGS. 9 and 10 are processing examples in which communication processing is performed using the network card 460 as the device. However, the device is not limited to the network card 460. Various other data processing devices that perform data processing, such as a video card, may be employed.

A general structure of this embodiment is as follows.

That is, an information processing apparatus includes a device that performs data processing, and a plurality of processors that have device drivers corresponding to the device. The device has processor-corresponding registers corresponding to the individual processors.

In such a structure, the processors each perform, in response to a data processing request for the device, writing of identification information indicating the presence of the data processing request into a corresponding one of the processor-corresponding registers. The device obtains items of identification information from the registers and sequentially performs data processing in response to data processing requests identified by the items of identification information. With such a structure, the device can sequentially perform processing in response to requests from the processors.

When a processor to be interrupted can be dynamically changed in accordance with the details of data to be sent/received, processing of an interrupt handler can be performed in any processor. This structure in which a processor to be interrupted can be dynamically changed in accordance with the details of data to be sent/received is described in the latter part of Japanese Unexamined Patent Application Publication No. 2007-206955, which is a patent application previously filed by the present assignee. The structure disclosed in this publication can be adopted.

Figure 13:
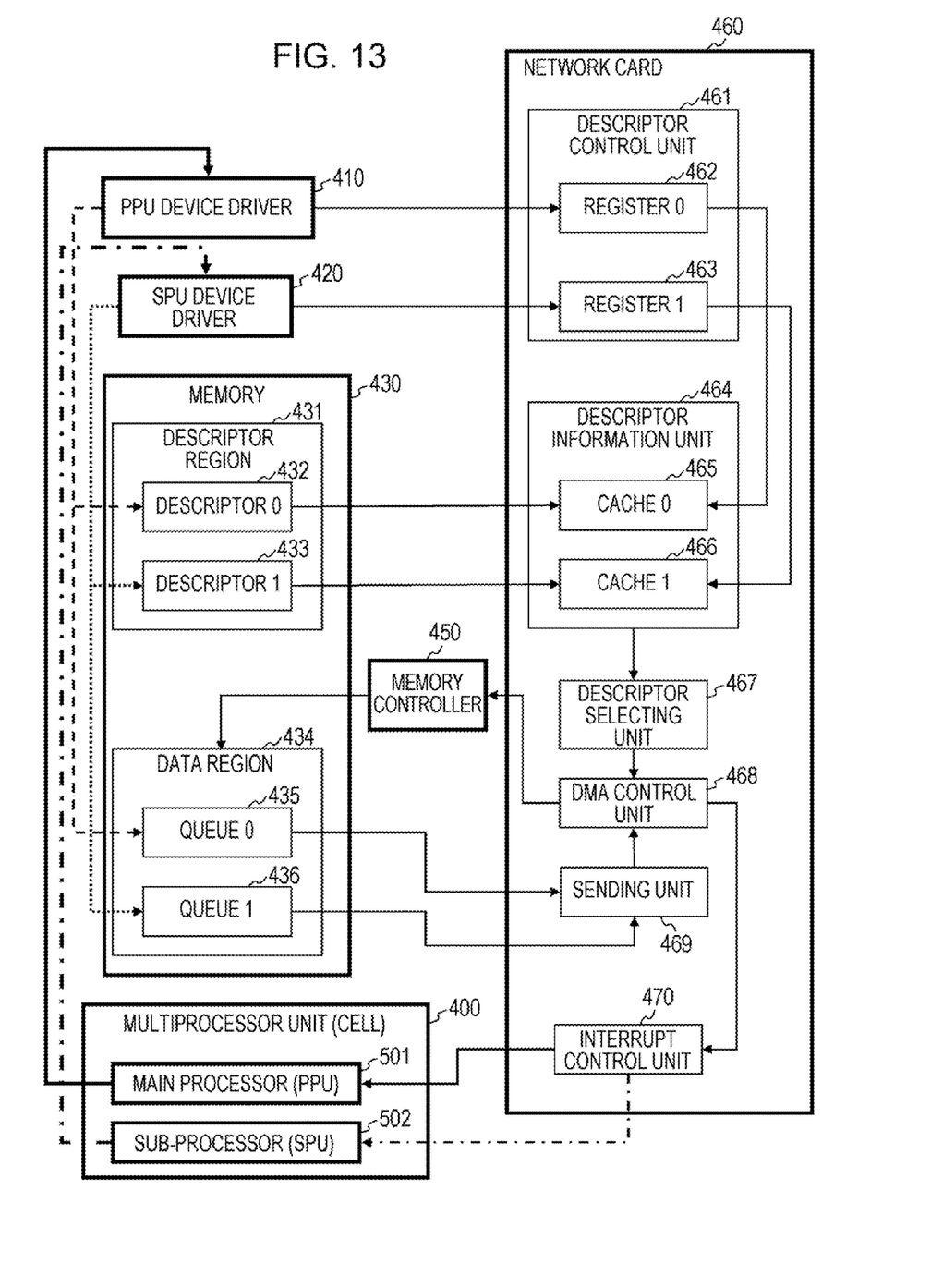
FIG. 13 is a diagram illustrating a structure example and processing of the information processing apparatus according to the embodiment of the present invention.

In this case, as shown in FIG. 13, the device (network card 460) can generate, using the interrupt control unit 470, an interrupt for a processor whose corresponding device driver is running. That is, an interrupt can be generated for a main processor (PPU) 501 or a sub-processor (SPU) 502 in the multiprocessor unit 400 shown in FIG. 13. Therefore, the state in which only the main processor (PPU) 501 is interrupted in a concentrated manner can be avoided.

The present invention has been described in detail in the context of specific embodiments. However, obviously, it is possible for those skilled in the art to make modifications or alternatives without departing from the scope of the present invention. That is, the present invention has been disclosed by way of example, and the present invention should not be construed as limited to the embodiments. The scope of the present invention should be determined on the basis of the claims.

The series of processes described in this specification can be executed by hardware, by software, or by a combination of hardware and software. When the series of processes is to be executed by software, a program recording the processing sequences is executed by installing it on a memory of a computer embedded in dedicated hardware or on a general-purpose computer that is capable of executing various processes. For example, the program may be recorded in advance on a recording medium. Besides installing the program into a computer from a recording medium, the program may be received via a network such as a local area network (LAN) or the Internet and may be installed on a recording medium, such as a built-in hard disk.

The processes described in this specification may be performed in a time-series manner according to the description, or may be executed in parallel or individually depending upon the processing performance of an apparatus executing the processes or according to the necessity. The term "system" in this specification is a logical set of a plurality of apparatuses and is not limited to the structure in which these apparatuses are housed in a single housing.

What is claimed is:

1. An information processing apparatus comprising:
  a device that performs data processing, the device being a network card; and
  a plurality of processors, each processor including a device driver corresponding to the network card,
  wherein each processor switches use of the device in accordance with a setting of the resource flag,
  wherein the device driver that is set in correspondence with at least one of the plurality of processors has a resource-state holding unit that manages the resource flag indicating which processor is using or is scheduled to use resources used at the time of data processing using the device,
  wherein at least one of the plurality of processors sets the resource flag to a flag value indicating that the at least one of the plurality of processors is scheduled to use the resources in accordance with a schedule of the at least one of the plurality of processors to use the device, and
  wherein at least one of the plurality of processors terminates or interrupts use of the device when the at least one of the plurality of processors refers to the resource flag and recognizes that another processor is scheduled to use the resources during a period in which the at least one of the plurality of processors is using the device.

2. The information processing apparatus according to claim 1,
  wherein each of the plurality of processors, including the device driver terminates or interrupts use of the device when the processor refers to the resource flag and recognizes that another processor is scheduled to use the resources during a period in which the processor is using the device, and
  wherein each of the plurality of processors sets the resource flag to a flag value indicating that the processor is scheduled to use the resources in accordance with the processor's schedule to use the device.

3. The information processing apparatus according to claim 1,
  wherein the plurality of processors include one main processor and a plurality of sub-processors, and
  wherein a device driver that is set in correspondence with the main processor includes the resource-state holding unit, which manages the resource flag.

4. The information processing apparatus according to any one of claims 1 to 3,
  wherein the plurality of processors have asymmetric multiprocessing structures with individually different architectures.

5. An information processing method performed by an information processing apparatus, the information processing apparatus including a device that performs data processing and a plurality of processors, the device being a network card and each processor including a device driver corresponding to the network card, each processor switching use of the device in accordance with a setting of the resource flag, and the device driver that is set in correspondence with at least one of the plurality of processors having a resource-state holding unit that manages the resource flag indicating which processor is using or is scheduled to use resources used at the time of data processing using the device, the method comprising the steps of:

setting, with at least one of the plurality of processors, the resource flag to a flag value indicating that the at least one of the plurality of processors is scheduled to use the resources in accordance with a schedule of the at least one of the plurality of processors to use the device; and     terminating or interrupting, with at least one of the plurality of processors, use of the device when the at least one of the plurality of processors refers to the resource flag and recognizes that another processor is scheduled to use the resources during a period in which the at least one of the plurality of processors is using the device.

6. A computer program for causing an information processing apparatus to perform information processing, the information processing apparatus including a device that performs data processing and a plurality of processors, the device being a network card and each processor including a device driver corresponding to the network card, each processor switching use of the device in accordance with a setting of the resource flag, and the device driver that is set in correspondence with at least one of the plurality of processors having a resource-state holding unit that manages the resource flag indicating which processor is using or is scheduled to use resources used at the time of data processing using the device, the computer program comprising the steps of:

causing at least one of the plurality of processors to set the resource flag to a flag value indicating that the at least one of the plurality of processors is scheduled to use the resources in accordance with a schedule of the at least one of the plurality of processors to use the device; and     causing at least one of the plurality of processors to terminate or interrupt use of the device when the at least one of the plurality of processors refers to the resource flag and recognizes that another processor is scheduled to use the resources during a period in which the at least one of the plurality of processors is using the device.

\* \* \* \* \*